US010382902B2

(12) United States Patent
Will et al.

(10) Patent No.: US 10,382,902 B2
(45) Date of Patent: Aug. 13, 2019

(54) SYSTEM AND METHOD FOR RENDERING RESPONSES TO BROADCAST ENTERPRISE MESSAGES

(71) Applicant: Verizon Patent and Licensing Inc., Arlington, VA (US)

(72) Inventors: Jason D. Will, Berkeley, CA (US); Deniz Karakas, Los Altos, CA (US); Lodema M. Steinbach, Clayton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/691,228

(22) Filed: Aug. 30, 2017

(65) Prior Publication Data

US 2019/0069140 A1 Feb. 28, 2019

(51) Int. Cl.
*H04W 4/06* (2009.01)
*H04L 12/58* (2006.01)
*H04W 4/14* (2009.01)

(52) U.S. Cl.
CPC ............... *H04W 4/06* (2013.01); *H04L 51/10* (2013.01); *H04W 4/14* (2013.01)

(58) Field of Classification Search
CPC ......... H04W 4/06; H04W 4/00; H04W 48/10; H04W 76/11; H04W 76/15; H04W 4/14; H04W 4/12; H04W 72/005
See application file for complete search history.

(56) References Cited

U.S. PATENT DOCUMENTS

| | | | | |
|---|---|---|---|---|
| 6,954,735 | B1 * | 10/2005 | Djupsjobacka | G06Q 30/06 701/533 |
| 2009/0187623 | A1 * | 7/2009 | Narayanaswami | G06Q 10/107 709/204 |
| 2011/0138064 | A1 * | 6/2011 | Rieger | H04N 21/25816 709/228 |
| 2016/0285816 | A1 * | 9/2016 | Schmid | G06Q 30/0631 |
| 2017/0295121 | A1 * | 10/2017 | Zhang | G06F 17/3053 |
| 2018/0005220 | A1 * | 1/2018 | Laracey | H04W 4/80 |

* cited by examiner

*Primary Examiner* — Keith Ferguson

(57) ABSTRACT

A device may receive, via an interface of the device, information associated with a broadcast enterprise message that is to be provided to a plurality of user devices. The device may provide the broadcast enterprise message to a plurality of user devices. The device may receive, from a user device, a response to the broadcast enterprise message. The device may generate a message thread that includes the broadcast enterprise message and the response. The device may provide, via the interface, information associated with the message thread.

20 Claims, 9 Drawing Sheets

SYSTEM AND METHOD FOR RENDERING RESPONSES TO BROADCAST ENTERPRISE MESSAGES

BACKGROUND

An enterprise customer of a wireless service provider might utilize a messaging application server to send a message to an individual customer of the wireless service provider. For example, a bank might send an account access verification message to a user device via a network of the wireless service provider. The enterprise customer might be provided with an enterprise identifier (e.g., a numeric code, such as a short code, a long code, and/or the like) with which to send and/or receive messages.

DETAILED DESCRIPTION OF PREFERRED EMBODIMENTS

Figure 1A:
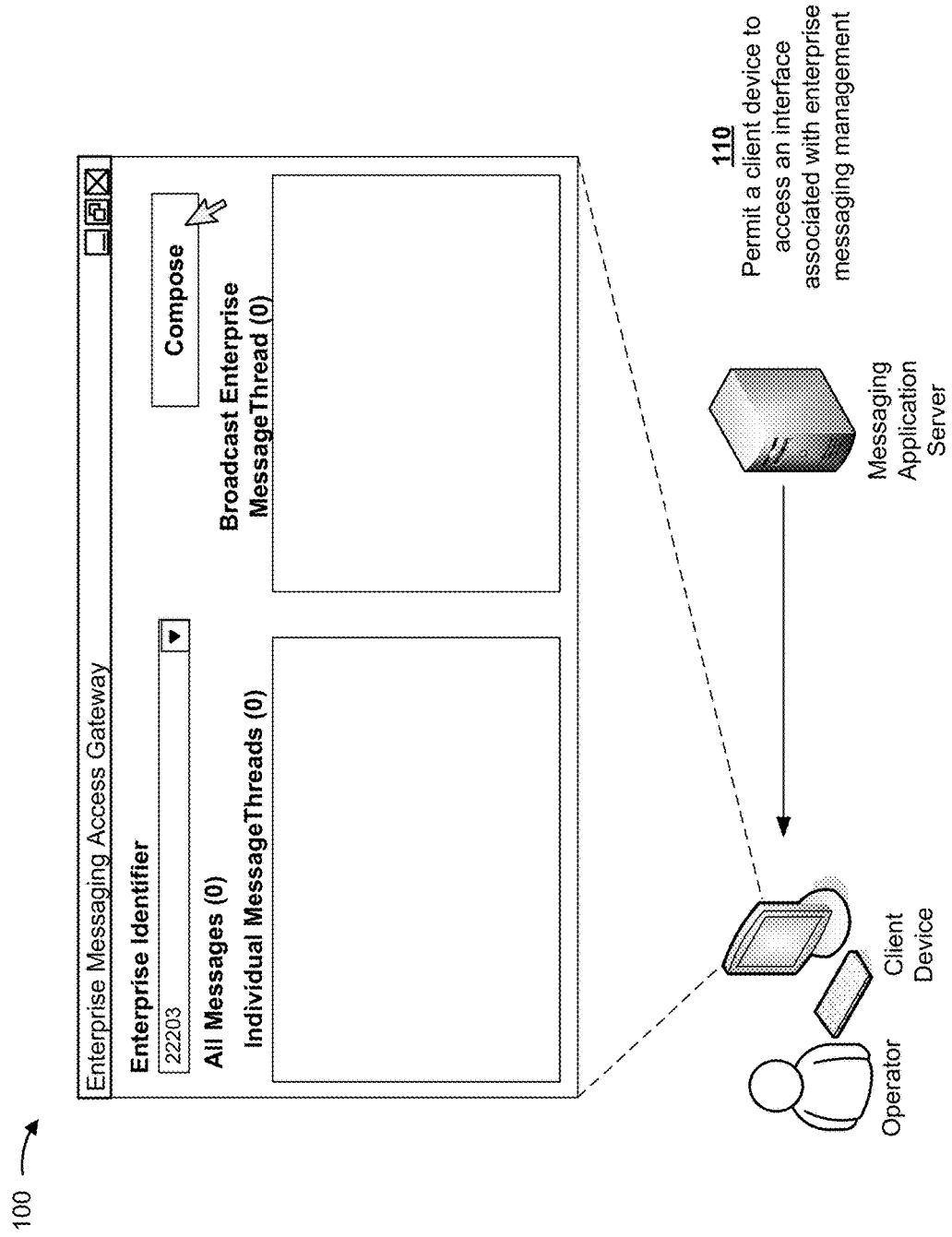
FIGS. 1A-1F are diagrams of an overview of an example implementation described herein.

The following detailed description of example implementations refers to the accompanying drawings. The same reference numbers in different drawings may identify the same or similar elements.

A messaging application server might provide broadcast enterprise messages to user devices. For example, a broadcast enterprise message might include a short message service (SMS) message, a multimedia message service (MMS) message, and/or the like, that is broadcast to a set of user devices. An enterprise (e.g., an organization, a business, a company, a group, and/or the like) can utilize a messaging application server to provide broadcast enterprise messages to hundreds, thousands, or millions of user devices. As examples, a broadcast enterprise message might include information regarding a promotion, information regarding an upcoming event, information regarding the enterprise, and/or the like. In this way, an enterprise can communicate with a large audience by sending broadcast enterprise messages using a messaging application server.

The broadcast enterprise messages might be associated with enterprise identifiers, such as short codes, long codes, telephone numbers, toll-free numbers, and/or the like. A wireless service provider can assign one or more enterprise identifiers to an enterprise, which enables the enterprise to send and/or receive messages, calls, and/or the like, via the enterprise identifiers.

An operator, associated with the enterprise, can utilize a client device to access an interface of the messaging application server. For example, the client device can provide, for display, information associated with the interface to permit the operator to manage broadcast enterprise messaging. The operator might interact with the client device to generate a broadcast enterprise message that is to be provided to a set of user devices, and cause the messaging application server to provide the broadcast enterprise message to the set of user devices.

In some cases, the enterprise might expect to receive, from user devices, responses to a broadcast enterprise message. Additionally, the enterprise might wish to reply to respective responses that are received from respective user devices. In other words, an operator might wish to communicate with users of the user devices on an individual basis. However, the operator might have difficulty communicating with individual users in situations where the messaging application server receives hundreds, thousands, or millions of responses to a broadcast enterprise message. Because all the messages are responding to the same broadcast message from the enterprise, they may be grouped into a single message stream making responding to them in an organized manner particularly troublesome. Additionally, managing responses to a broadcast enterprise message might prove impractical, error-prone, time-consuming, and/or the like, in situations where the messaging application server receives such a large quantity of individual responses to a broadcast enterprise message. As such, processor and/or memory resources of the messaging application server and/or the client device are consumed and/or network resources are consumed.

Some implementations described herein provide a messaging application server that may provide a broadcast enterprise message to a set of user devices, and receive individual responses from respective user devices. Additionally, some implementations described herein permit the messaging application server to generate individual message threads that correspond to respective responses. Additionally, some implementations described herein permit the messaging application server to provide, to a client device and via an interface of the messaging application server, information associated with the individual message threads.

As used herein, an individual message thread may refer to a thread of messages that includes messages communicated between the messaging application server and a particular user device. For example, an individual message thread may be associated with a particular enterprise identifier and a particular user device identifier (e.g., a mobile directory number (MDN), a mobile equipment identifier (MEID), an international mobile subscriber identity number (IMSI), and/or the like). In other words, an individual message thread may include messages provided by a messaging application server, using a particular enterprise identifier, to a particular user device that is identified by a particular user device identifier, and/or messages provided by the particular user device to the messaging application server.

By generating individual message threads that correspond to respective user devices, some implementations described herein reduce an amount of time associated with managing responses to broadcast enterprise messages, permit an operator to more efficiently reply to responses, store responses, track and catalogue responses, and/or the like. In this way, some implementations described herein conserve processor and/or memory resources of client devices and messaging application servers associated with managing enterprise messages, and/or conserve network resources.

FIGS. 1A-1F are diagrams of an overview of an example implementation 100 described herein. As shown in FIG. 1A, and by reference number 110, a messaging application server may permit a client device to access an interface, of the messaging application server, that is associated with enterprise messaging management. For example, the messaging application server may permit an operator to access, using a client device, an interface of the messaging application server to generate broadcast enterprise messages, to cause the broadcast enterprise messages to be sent, to view responses to the broadcast enterprise messages, to reply to responses, and/or the like.

As shown in FIG. 1A, the client device may provide, for display, message threads associated with a particular enterprise identifier (e.g., the short code 22203). For example, the client device may provide, for display, a broadcast enterprise message thread that includes broadcast enterprise messages that have been sent by the messaging application server using the short code. Additionally, the client device may provide, for display, individual message threads that include messages communicated between the messaging application server and respective user devices.

As an example, assume that the operator wishes to cause a broadcast enterprise message to be sent to a set of user devices. In this case, and as shown, the operator may interact with the client device to select a "compose" menu item.

Figure 1B:
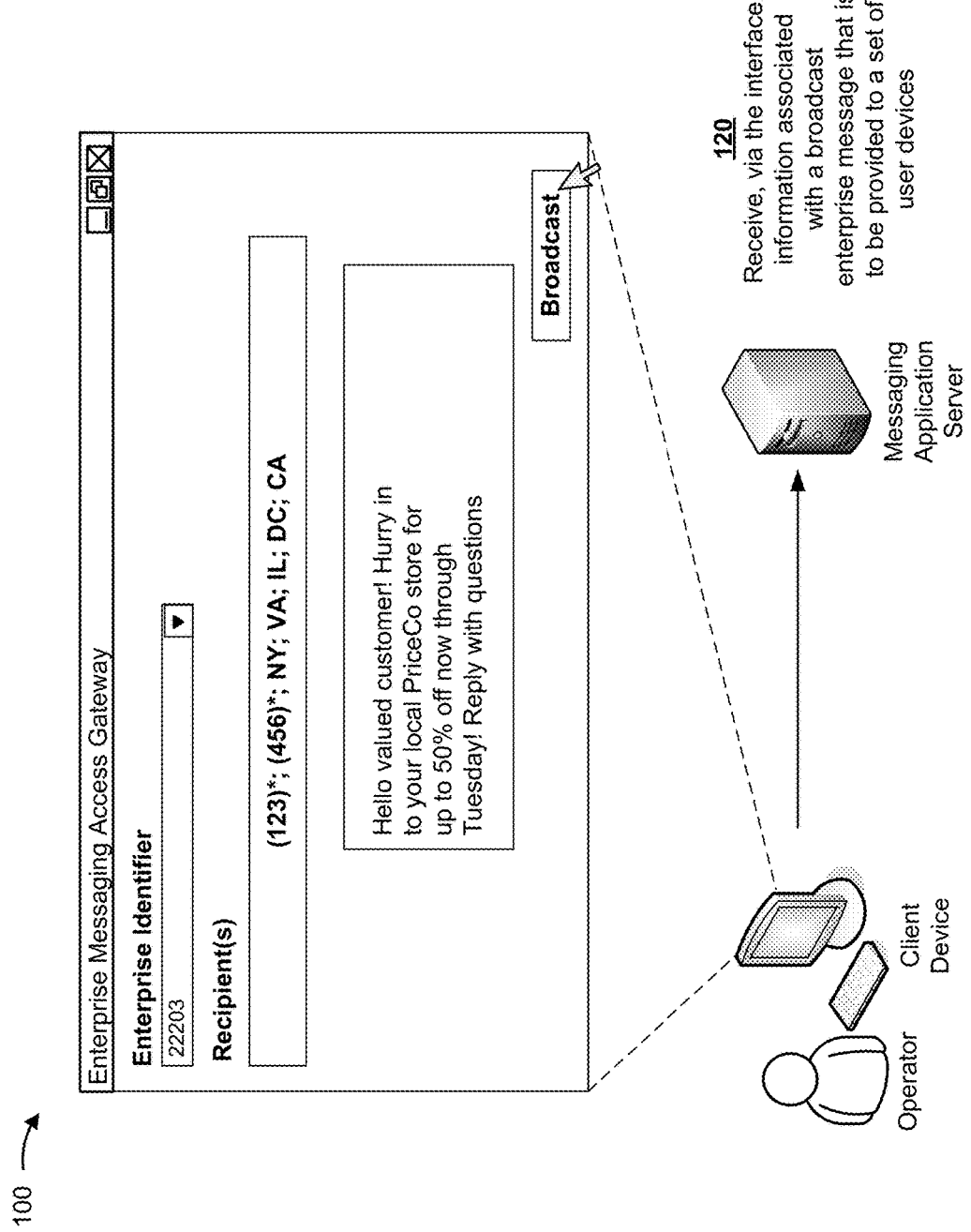

As shown in FIG. 1B, and by reference number 120, the messaging application server may receive, via the interface, information associated with a broadcast enterprise message that is to be provided to a set of user devices. For example, as shown, the operator may interact with the client device to select an enterprise identifier (e.g., the short code 22203) that is to be used to send the broadcast enterprise message, to input information that permits identification of MDNs of user devices to which the broadcast enterprise message is to be sent, and to input the content of the broadcast enterprise message. As shown, the operator may select a "broadcast" menu item that causes the messaging application server to send the broadcast enterprise message to a set of user devices, as described below.

Figure 1C:
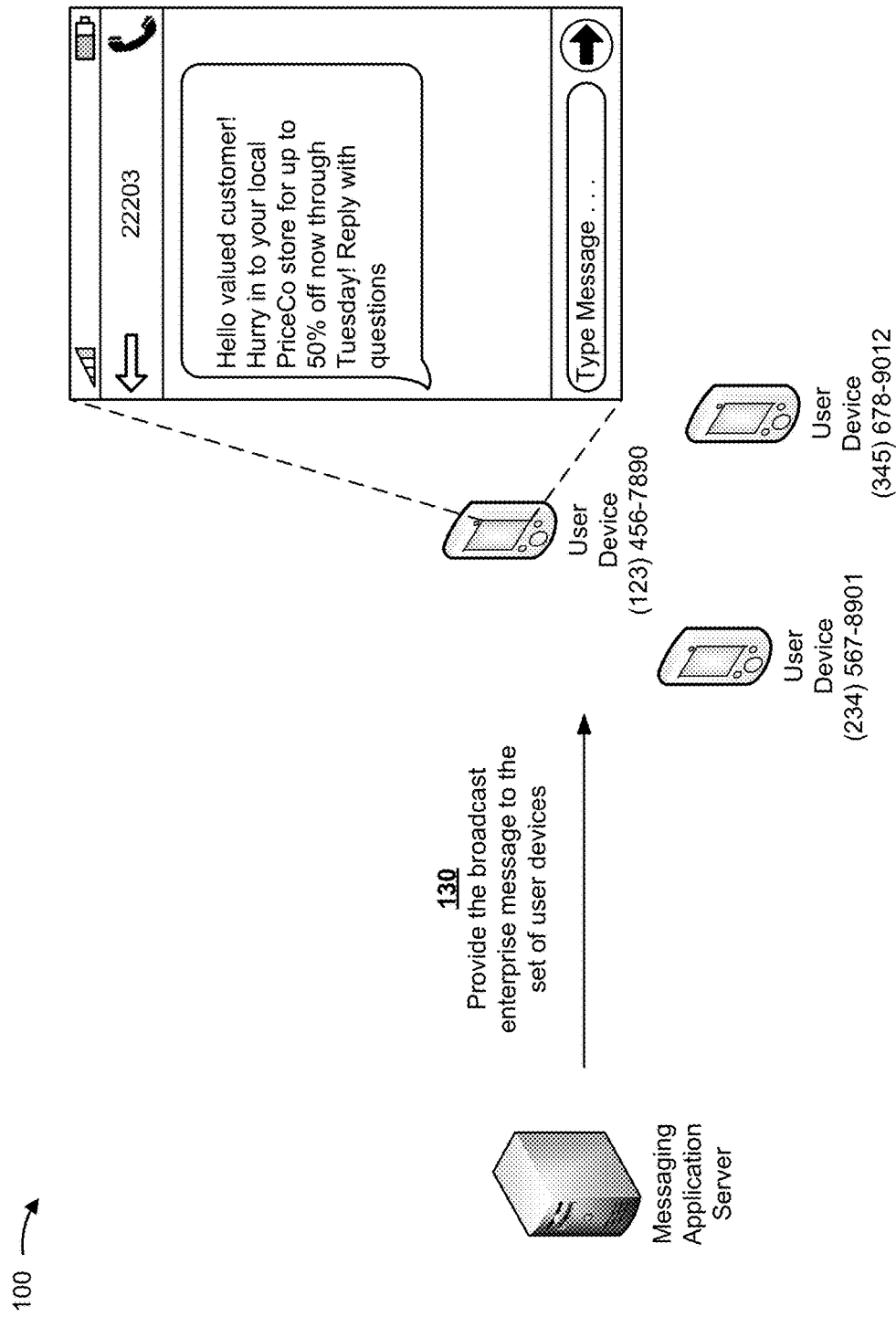

As shown in FIG. 1C, and by reference number 130, the messaging application server may provide the broadcast enterprise message to the set of user devices. For example, as shown, the messaging application server may provide the broadcast enterprise message to user devices that include MDNs that were identified to receive the broadcast enterprise message. While a particular number of user devices are shown in FIG. 1C, it should be understood that, in practice, hundreds, thousands, or millions of user devices might receive a particular broadcast enterprise message. As shown, a user device may provide, for display, the broadcast enterprise message. In this way, a user, of the user device, may cause a user device to provide a response to the broadcast enterprise message, as described below.

Figure 1D:
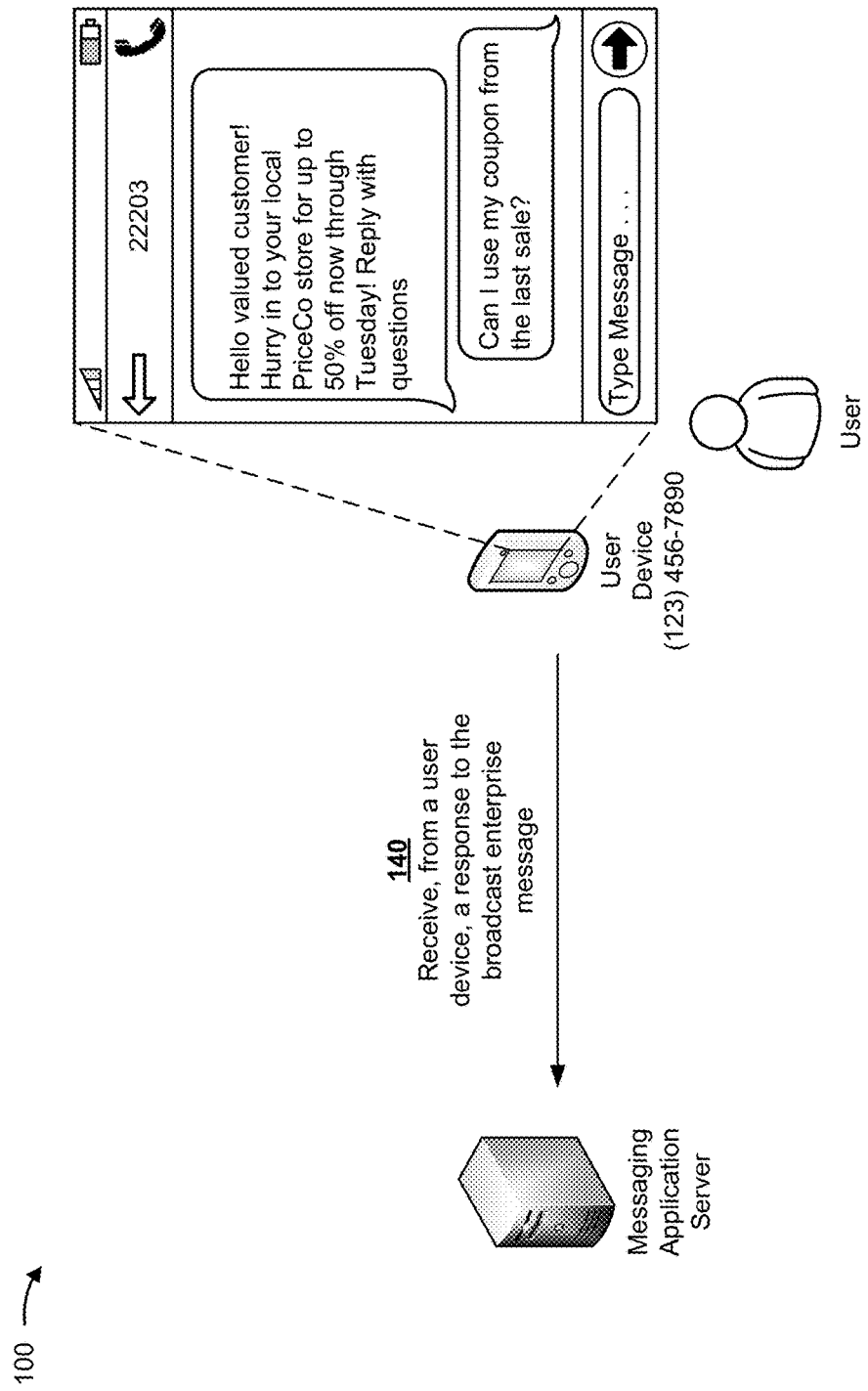

As shown in FIG. 1D, and by reference number 140, the messaging application server may receive, from a user device, a response to the broadcast enterprise message. For example, a user may interact with the user device to cause the user device to provide, to the messaging application server, a response to the broadcast enterprise message. In this way, the messaging application server may receive the response, and generate an individual message thread that includes the response, as described below.

Figure 1E:
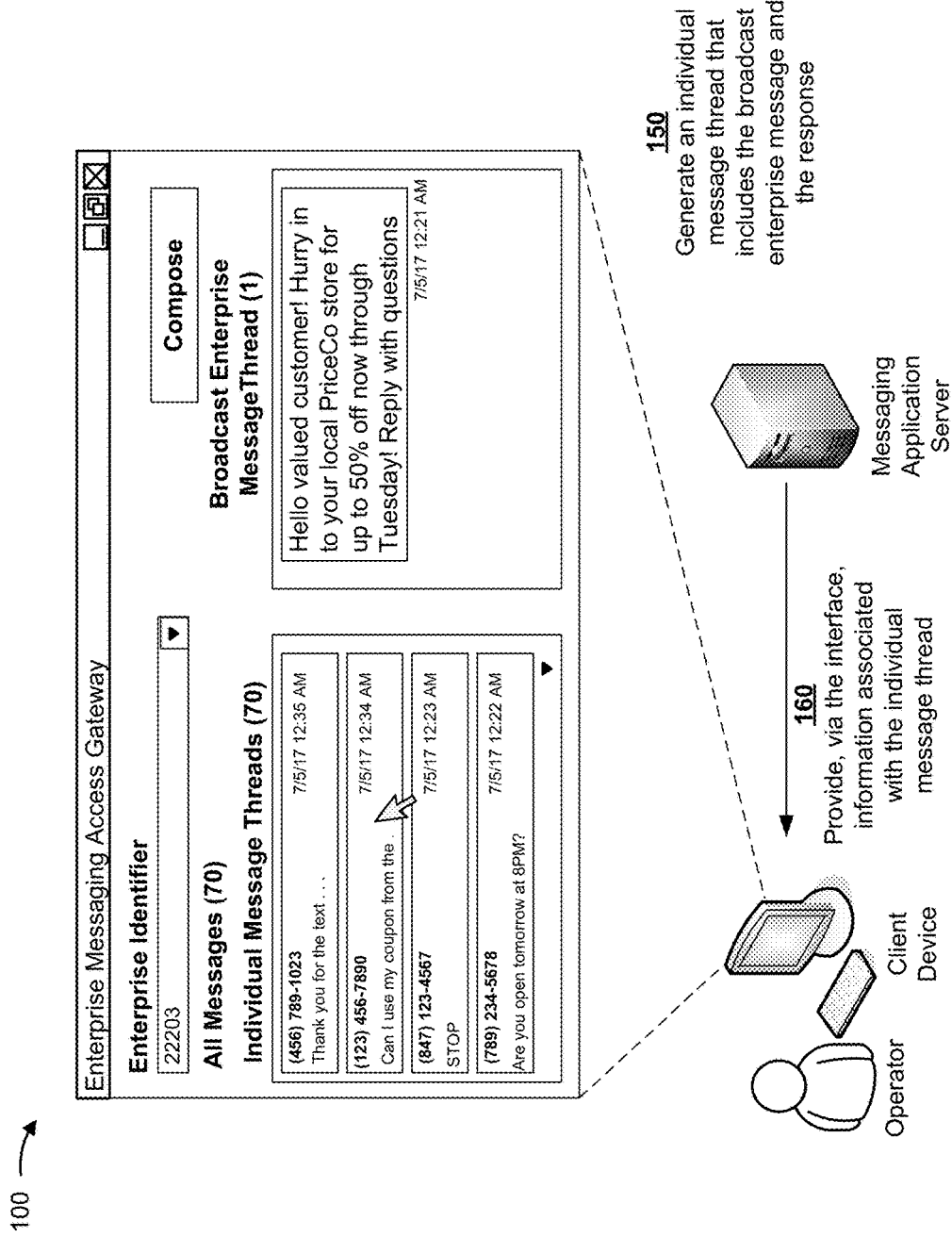

As shown in FIG. 1E, and by reference number 150, the messaging application server may generate an individual message thread that includes the broadcast enterprise message and the response. For example, the messaging application server may generate an individual message thread that includes messages communicated between the messaging application server and the particular user device associated with the MDN of (123) 456-7890. As used herein, an individual message thread may refer to a thread of messages that are communicated between a messaging application server, using a particular enterprise identifier, and a particular user device that is associated with a particular user device identifier.

The messaging application server may generate a set of individual message threads, where each of the individual message threads corresponds to a particular user device. For example, some or all of the user devices that received the broadcast enterprise message may provide responses to the messaging application server. As such, the messaging application server may generate a number of individual message threads that corresponds to a number of received responses.

Additionally, the messaging application server may generate (or update) a broadcast enterprise message thread that includes broadcast enterprise messages provided by the messaging application server. As shown, the broadcast enterprise message thread may include the broadcast enterprise message that was provided in association with FIG. 1C.

As further shown in FIG. 1E, and by reference number 160, the messaging application server may provide, via the interface, information associated with the individual message thread. The messaging application server may permit the client device to access the interface of the messaging application server, and provide, for display, information associated with the individual message threads and the broadcast enterprise message thread based on accessing the interface. For example, as shown, the client device may provide, for display, the individual message threads and the broadcast enterprise message thread.

In this way, an operator may interact with the client device to reply to a response associated with an individual message thread. For example, as shown, assume that the operator selects a particular individual message thread that corresponds to the user device having the MDN of (123) 456-7890.

Figure 1F:
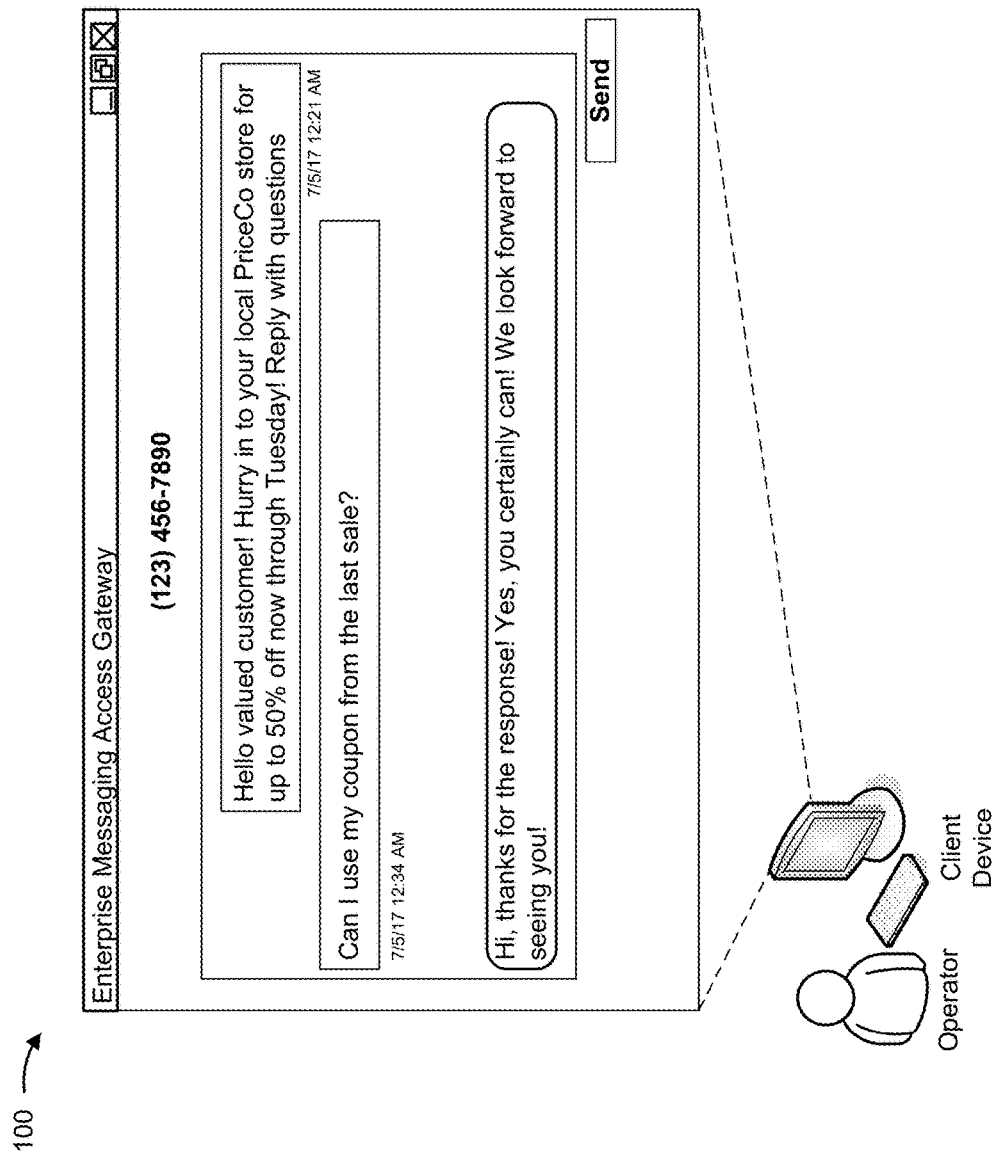

As shown in FIG. 1F, the client device may provide, for display, information associated with the particular individual message thread. For example, as shown, the individual message thread may include the broadcast enterprise message, and the response to the broadcast enterprise message. Additionally, as shown, the operator may interact with the client device to provide a reply to the response. In other words, the operator may, via the messaging application server and using the client device, individually communicate with a particular user device (e.g., via unicast messaging rather than broadcast messaging).

In this way, some implementations described herein permit an operator to more efficiently reply to responses to a broadcast enterprise message than as compared to situations where individual message threads are not generated. Additionally, in this way, some implementations described herein reduce an amount of time associated with providing replies to responses, thereby conserving processor and/or memory resources of client devices and messaging application servers. For example, instead of sifting through a thread that includes hundreds, thousands, etc. of responses, the operator may more quickly identify particular responses based on various individual message threads.

Additionally, some implementations described herein increase ease of sorting through messages, and permit the ability to track, store, and analyze, etc. the As indicated above, FIGS. 1A-1F are provided merely as an example. Other examples are possible and may differ from what was described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
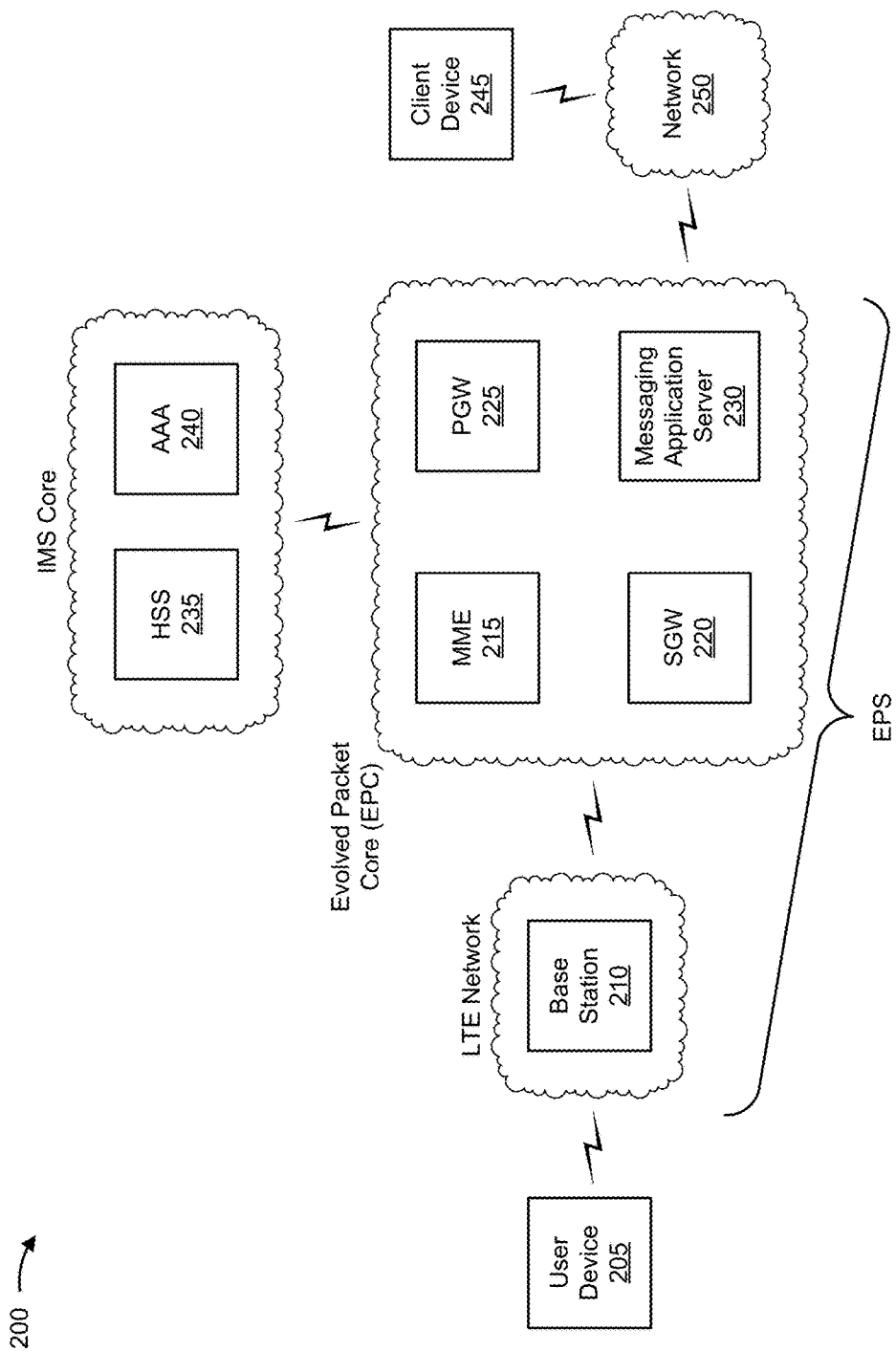
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity device (MME) 215, a serving gateway (SGW) 220, a packet data network gateway (PGW) 225, a messaging application server 230, a home subscriber server (HSS) 235, an authentication, authorization, and accounting server (AAA) 240, a client device 245, and a network 250. Devices of environment 200 may interconnect via wired connections, wireless connections, optical connections, or a combination of connections.

Some implementations are described herein as being performed within a long term evolution (LTE) network for explanatory purposes. Some implementations may be performed within a network that is not an LTE network, such as a fifth generation (5G) network, a third generation (3G) network, or other advanced networks.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user device 205 communicates with the EPC. The EPC may include MME 215, SGW 220, and/or PGW 225, and messaging application server 230 that enable user device 205 to communicate with network 250 and/or an Internet protocol (IP) multimedia subsystem (IMS) core. The IMS core may include HSS 235 and/or AAA 240, and may manage device registration and authentication, session initiation, etc., associated with user devices 205. HSS 235 and/or AAA 240 may reside in the EPC and/or the IMS core.

User device 205 includes one or more devices capable of communicating with base station 210 and/or a network (e.g., network 250). For example, user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User device 205 may send traffic to and/or receive traffic from network 250 (e.g., via base station 210, SGW 220, PGW 225, and/or client device 245).

Base station 210 includes one or more devices capable of transferring traffic, such as audio, video, text, and/or other traffic, destined for and/or received from user device 205. In some implementations, base station 210 may include an eNB associated with the LTE network that receives traffic from and/or sends traffic to network 250 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with user device 205. In some implementations, MME 215 may perform operations relating to authentication of user device 205. Additionally, or alternatively, MME 215 may facilitate the selection of a particular SGW 220, a particular PGW 225 and/or a particular client device 245 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 250 (e.g., via PGW 225) and/or other network devices associated with the EPC and/or the IMS core. SGW 220 may also receive traffic from network 250 and/or other network devices, and may send the received traffic to user device 205 via base station 210. Additionally, or alternatively, SGW 220 may perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 250. Additionally, or alternatively, PGW 225 may receive traffic from network 250, and may send the traffic to user device 205 via SGW 220 and base station 210. PGW 225 may record data usage information (e.g., byte usage), and may provide the data usage information to AAA 240.

Messaging application server 230 includes one or more devices capable of receiving, processing, storing, generating, and/or providing information associated with an enterprise message. For example, messaging application server 230 may include a server device (e.g., a host server, a web server, an application server, a server associated with a data center, etc.), a cloud computing device, or a similar device.

In some implementations, messaging application server 230 may generate an enterprise message, and may provide the enterprise message to user device 205 (e.g., via an enterprise messaging service of a wireless service provider being utilized by messaging application server 230 and/or user device 205). For example, messaging application server 230 may transmit the enterprise message (e.g., a bank confirmation code, a product offer, etc.) and the wireless service provider may route the message (e.g., via the EPC, the LTE network, etc.) to user device 205.

HSS 235 includes one or more devices, such as one or more server devices, capable of managing (e.g., receiving, generating, storing, processing, and/or providing) information associated with user device 205. For example, HSS 235 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

AAA 240 includes one or more devices, such as one or more server devices, that perform authentication, authorization, and/or accounting operations for communication sessions associated with user device 205. For example, AAA 240 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, etc.), and/or may perform similar operations.

Client device 245 includes one or more devices capable of receiving, processing, storing, generating, and/or providing information associated with broadcast enterprise messages. For example, client device 245 may include a smart phone, a laptop computer, a tablet computer, a desktop computer, or a similar device. In some implementations, client device 245 may access an interface of messaging application server 230 to utilize an enterprise messaging service.

Network 250 includes one or more wired and/or wireless networks. For example, network 250 may include a cellular network (e.g., a 5G network, an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
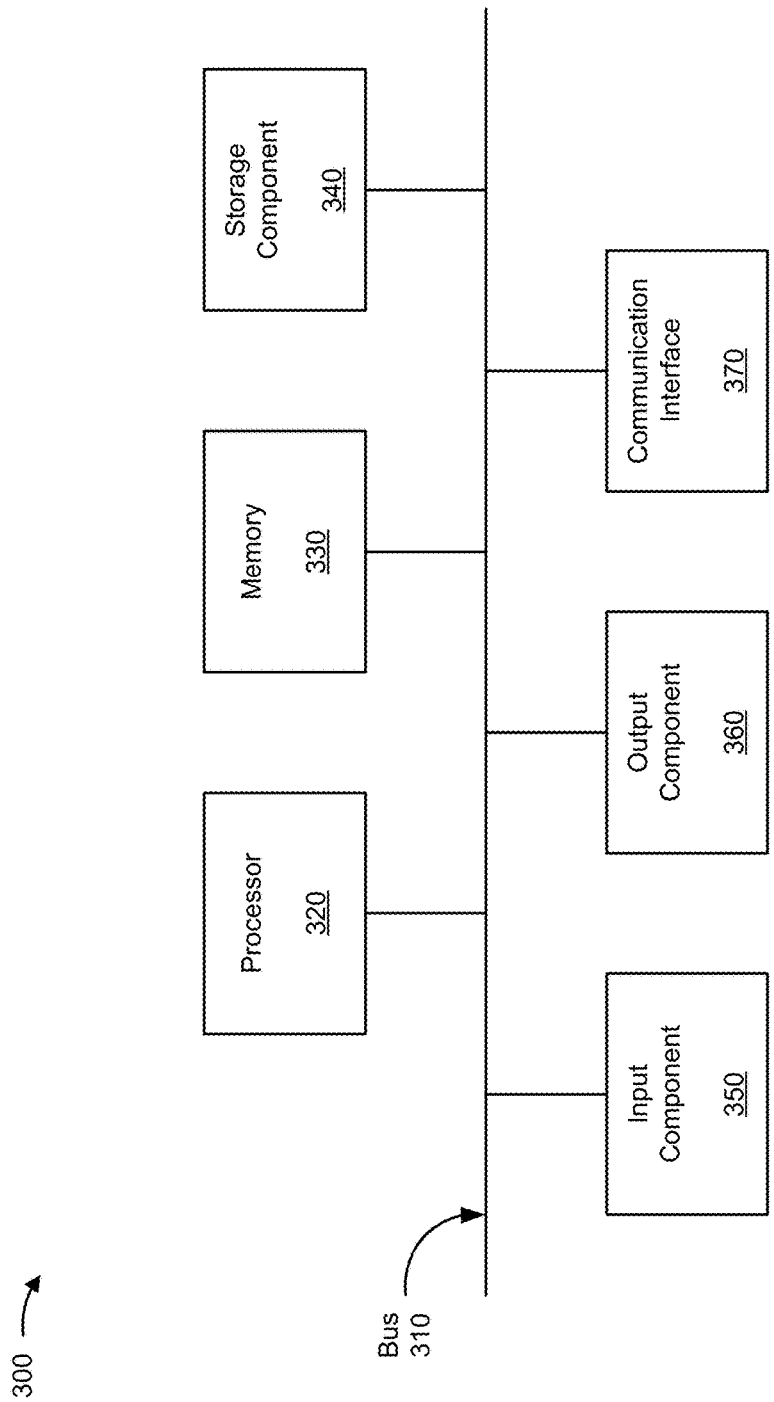
FIG. 3 is a diagram of example components of one or more devices of FIG. 2.

FIG. 3 is a diagram of example components of a device 300. Device 300 may correspond to user device 205, base station 210, MME 215, SGW 220, PGW 225, messaging application server 230, HSS 235, AAA 240, and/or client device 245. In some implementations, user device 205, base station 210, MME 215, SGW 220, PGW 225, messaging application server 230, HSS 235, AAA 240, and/or client device 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
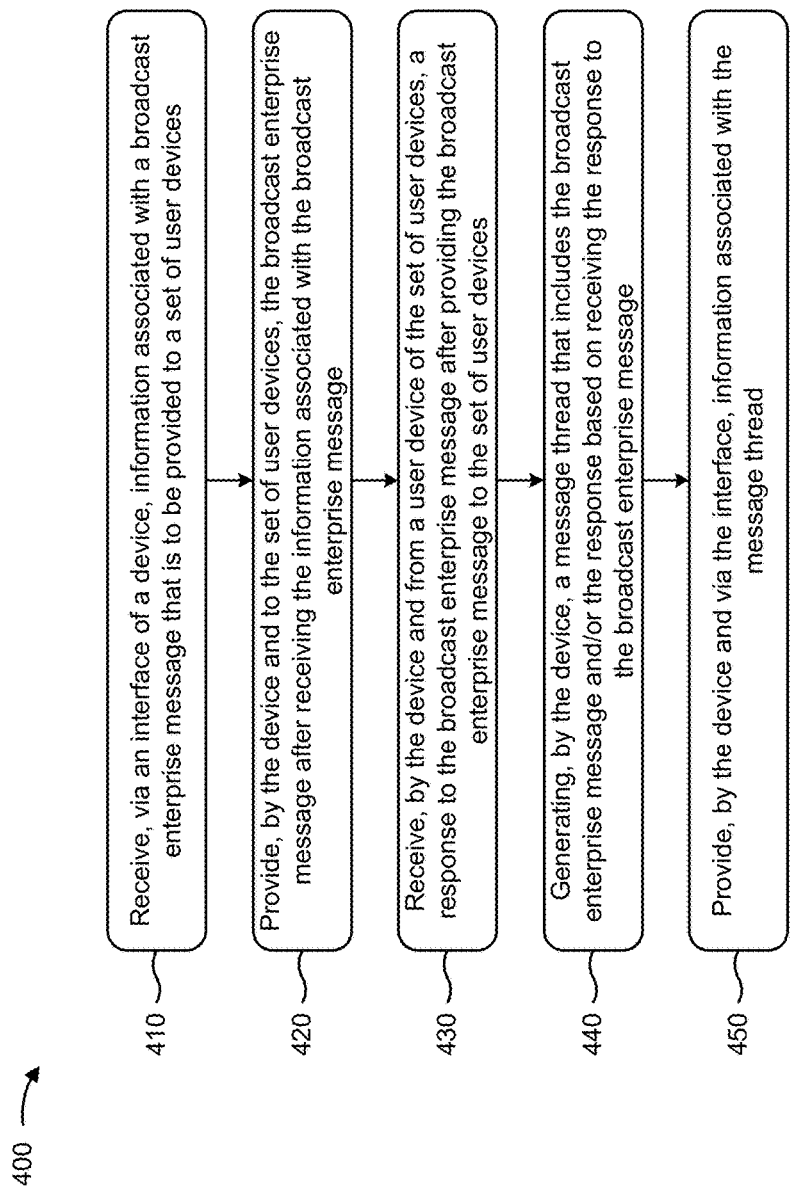
FIG. 4 is a flow chart of an example process for rendering responses to broadcast enterprise messages.

FIG. 4 is a flow chart of an example process 400 for rendering responses to broadcast enterprise messages. In some implementations, one or more process blocks of FIG. 4 may be performed by messaging application server 230. In some implementations, one or more process blocks of FIG. 4 may be performed by another device or a group of devices separate from or including messaging application server 230, such as user device 205, base station 210, MME 215, SGW 220, PGW 225, HSS 235, AAA 240, and/or client device 245.

As shown in FIG. 4, process 400 may include receiving, via an interface of a device, information associated with a broadcast enterprise message that is to be provided to a set of user devices (block 410). For example, messaging application server 230 may receive, from client device 245, information associated with a broadcast enterprise message that is to be provided to hundreds, thousands, or millions of user devices 205.

In some implementations, messaging application server 230 may permit client device 245 to access an interface of messaging application server 230 to manage broadcast enterprise messages in association with an enterprise messaging service. For example, client device 245 may provide, for display, information associated with the interface to permit an operator of client device 245 to manage broadcast enterprise messages, such as by generating broadcast enterprise messages, causing broadcast enterprise messages to be sent, replying to responses to broadcast enterprise messages, and/or the like.

In some implementations, messaging application server 230 may receive, from client device 245 (e.g., which may have received an input from an operator), the information associated with the broadcast enterprise message. For example, an operator may interact with client device 245 to generate a broadcast enterprise message that is to be provided to a set of recipient user devices 205.

In some implementations, messaging application server 230 may receive information that identifies an enterprise identifier that is to be used to send the broadcast enterprise message. In some implementations, an enterprise identifier may include a network address, a short code, a long code, a telephone number, a toll-free telephone number, an email address, an instant messaging (IM) address, a name, a logo, an image, an icon, and/or the like. In some implementations, an enterprise may be associated with multiple enterprise identifiers. For example, a wireless service provider may assign a set of enterprise identifiers to an enterprise, which enables the enterprise to send and/or receive messages, calls, etc. and/or the like via the enterprise identifiers.

In some implementations, messaging application server 230 may receive, from client device 245, information that identifies a selection of a particular enterprise identifier to be used to send the broadcast enterprise message. For example, client device 245 may provide, for display, information that identifies the set of enterprise identifiers, and receive a user input that identifies a particular enterprise identifier to be used when sending the broadcast enterprise message.

In some implementations, messaging application server 230 may receive information that identifies a set of user devices 205 that is to receive the broadcast enterprise message. For example, messaging application server 230 may receive information associated with respective user device identifiers, such as mobile directory numbers (MDNs), mobile equipment identifiers (MEIDs), international mobile subscriber identity numbers (IMSIs), international mobile equipment identity numbers (IMEIs), telephone numbers, network addresses, account identifiers, email addresses, and/or the like.

In some implementations, messaging application server 230 may access a database that stores information associated with user device identifiers. For example, a user may interact with user device 205 to cause user device 205 to opt in, to subscribe to, to receive alerts, and/or the like, associated with an enterprise identifier and/or an enterprise message service. Additionally, a database may store information associated with a user device identifier of user device 205 based on user device 205 opting in, subscribing, etc. In practice, a database may store thousands, millions, billions, etc. of user device identifiers.

In some implementations, messaging application server 230 may receive information that permits messaging application server 230 to identify a set of recipient user devices 205. For example, messaging application server 230 may receive information (e.g., a lookup identifier, a key, a token, a query identifier, and/or the like) that permits messaging application server 230 to perform a lookup in a database to identify the set of recipient user devices 205. Additionally, or alternatively, messaging application server 230 may receive information that identifies a particular geolocation, a state, a city, a town, a zip code, an area code, and/or the like, and may identify the set of recipient user devices 205 based on the information. Additionally, or alternatively, messaging application server 230 may receive information that identifies a particular set of user devices 205 (e.g., a group of user devices 205, a group of users, and/or the like).

In some implementations, messaging application server 230 may receive information associated with content of the broadcast enterprise message. For example, the content may include text, audio, video, and/or the like, that is to be provided in association with the broadcast enterprise message. In this way, messaging application server 230 may receive, via the interface of messaging application server 230, information associated with an enterprise identifier to be used to send the broadcast enterprise message, a set of recipient user devices 205 that is to receive the broadcast enterprise message, and the content of the broadcast enterprise message. In this way, messaging application server 230 may provide, using the enterprise identifier, the broadcast enterprise message to the set of user devices 205, as described below.

As further shown in FIG. 4, process 400 may include providing, by the device and to the set of user devices, the broadcast enterprise message after receiving the information associated with the broadcast enterprise message (block 420). For example, messaging application server 230 may provide, to the set of user devices 205, the broadcast enterprise message based on receiving, from client device 245, information that causes messaging application server 230 to provide the broadcast enterprise message.

In some implementations, messaging application server 230 may generate a broadcast enterprise message thread based on providing the broadcast enterprise message. In some implementations, a broadcast enterprise message thread may include a thread of broadcast enterprises messages that were provided by messaging application server 230. In some implementations, messaging application server 230 may generate a broadcast enterprise message thread that is specific to a particular enterprise identifier. For example, messaging application server 230 may generate a broadcast enterprise message thread that includes broadcast enterprise messages that are sent in association with a particular enterprise identifier.

In some implementations, messaging application server 230 may generate a broadcast enterprise message thread after providing a broadcast enterprise message to a set of user devices 205. Additionally, or alternatively, messaging application server 230 may update a broadcast enterprise message thread after providing additional broadcast enterprise messages that were sent in association with a particular enterprise identifier.

In some implementations, messaging application server 230 may permit client device 245 to access an interface of messaging application server 230 that includes a broadcast enterprise message thread. In this way, client device 245 may provide, for display, information associated with the interface and/or the broadcast enterprise message thread. Additionally, in this way, some implementations described herein permit client device 245 to provide, for display, separate broadcast enterprise message threads that correspond to different enterprise identifiers.

In this way, some implementations described herein reduce an amount of time associated with managing broadcast enterprise messages as compared to situations where separate broadcast enterprise message threads are not generated. Thereby, some implementations described herein conserve processor and/or memory resources of client device 245 and messaging application server 230, and/or conserve network resources.

In this way, messaging application server 230 may provide a broadcast enterprise message, and may receive individual responses from respective user devices 205 after providing the broadcast enterprise message, as described below.

As further shown in FIG. 4, process 400 may include receiving, by the device and from a user device of the set of user devices, a response to the broadcast enterprise message after providing the broadcast enterprise message to the set of user devices (block 430). For example, messaging application server 230 may receive, from a particular user device 205, a response to the broadcast enterprise message.

In some implementations, messaging application server 230 may receive hundreds, thousands, or millions of responses to the broadcast enterprise message. In other words, messaging application server 230 may receive responses from some or all of the user devices 205 to which the broadcast enterprise message was sent. In some implementations, and as described below, messaging application server 230 may generate individual message threads that correspond to particular user devices 205.

As further shown in FIG. 4, process 400 may include generating, by the device, a message thread that includes the broadcast enterprise message and/or the response based on receiving the response to the broadcast enterprise message (block 440). For example, messaging application server 230 may generate an individual message thread that is specific to a particular user device 205, and specific to a particular enterprise identifier via which the broadcast enterprise message was sent.

In some implementations, an individual message thread may include a thread of messages communicated between messaging application server 230 and a particular user device 205. In some implementations, messaging application server 230 may generate a set of individual message threads. For example, messaging application server 230 may generate an individual message thread for each user device 205 that provides a message (e.g., response) to messaging application server 230.

In some implementations, messaging application server 230 may generate an individual message thread based on providing the broadcast enterprise message. For example, messaging application server 230 may generate an individual message thread for each user device 205 to which the broadcast enterprise message is sent. Additionally, or alternatively, messaging application server 230 may generate an individual message thread for a particular user device 205 based on receiving a response from the particular user device 205. Additionally, or alternatively, messaging application server 230 may generate an individual message thread based on receiving a message from user device 205 (e.g., without having provided a broadcast enterprise message to user device 205).

In some implementations, messaging application server 230 may add a message to an individual message thread based on an enterprise identifier and a user device identifier associated with the message. For example, an individual message thread may include a broadcast enterprise message that was provided, by messaging application server 230 and in association with a particular enterprise identifier, to a particular user device 205. Additionally, or alternatively, an individual message thread may include a message provided by the particular user device 205 to messaging application server 230 (e.g., a response to the broadcast enterprise message). Additionally, or alternatively, an individual message thread may include a unicast message provided by messaging application server 230 to the particular user device 205 (e.g., a reply to the response to the broadcast enterprise message).

In some implementations, messaging application server 230 may identify (e.g., based on stored messages in a data structure) messages that are associated with the enterprise identifier and the user device identifier (e.g., were previously communicated between messaging application server 230 and user device 205), and add the messages to the individual message thread. That is, messaging application server 230 may identify other messages that are not associated with a conversation associated with the broadcast enterprise message or the response. In other words, messaging application server 230 may identify other communications (e.g., associated with other previous conversations) between messaging application server 230 and user device 205.

In some implementations, messaging application server 230 may add the messages to an individual message thread based on time stamps associated with the messages. For example, messaging application server 230 may add the messages to the individual message thread such that messages associated with more recent time stamps appear towards the top of the individual message thread as compared to other messages associated with less recent time stamps.

In this way, messaging application server 230 may generate an individual message thread, and provide, to client device 245, information associated with the individual message thread, as described below.

As further shown in FIG. 4, process 400 may include providing, by the device and via the interface, information associated with the message thread (block 450). For example, messaging application server 230 may permit client device 245 to access the interface of messaging application server 230 that includes the individual message thread, and provide, for display, information associated with the individual message thread.

In this way, client device 245 may provide, for display, the individual message thread and messages included with the individual message thread. In this way, an operator of client device 245 may interact with client device 245 to manage enterprise messages, such as by replying to responses provided by user devices 205, providing additional broadcast enterprise messages, and/or the like.

In some implementations, messaging application server 230 may provide information associated with a set of individual message threads. For example, client device 245 may access the interface of messaging application server 230 and provide, for display, a set of individual message threads. In some implementations, client device 245 may provide, for display, individual message threads in an order based on time stamps associated with the individual message threads. For example, client device 245 may provide, for display, individual message threads that include messages that were most recently received towards a top of a list, before other individual message threads that include messages that were not as recently received, and/or the like.

In some implementations, messaging application server 230 may permit client device 245 to filter individual message threads based on an enterprise identifier. For example, an operator of client device 245 may cause client device 245 to provide, for display, individual message threads that are associated with a particular enterprise identifier. Additionally, or alternatively, messaging application server 230 may permit client device 245 to filter individual message threads based on a broadcast enterprise message. For example, an operator of client device 245 may specify a particular broadcast enterprise message for which individual message threads are to be provided for display, and client device 245 may provide the individual message threads for display. Additionally, or alternatively, client device 245 may permit an operator to filter individual message threads based on time stamps or a time frame, based on geolocations of user devices 205, based on demographic information associated with users of user devices 205, based on subscription statuses of users of user devices 205, based on priority levels associated with user devices 205, based on text associated with particular messages, and/or the like.

In some implementations, messaging application server 230 may receive a response from user device 205 and perform an action based on the response (e.g., automatically and without intervention of an operator). For example, messaging application server 230 may receive, from user device 205, a message and may parse the message using a set of natural language text processing techniques, and perform an action based on using the set of natural language processing techniques. As examples, the action may correspond to automatically sending a message to user device 205, automatically populating a reply that is capable of being sent to user device 205 and permitting an operator view the reply in association with the interface, automatically changing a subscription status of user device 205 (e.g., unsubscribing user device 205, subscribing user device 205 to a service and/or account, and/or the like), automatically providing information associated with user device 205 to client device 245, and/or the like.

In some implementations, messaging application server 230 may automatically provide, to user device 205, a reply based on a message received from user device 205. As an example, assume that the message from user device 205 includes text, such as "phone number," "phone," "number," "ph number," "ph," "no.," etc. In this case, messaging application server 230 may identify a phone number of the enterprise, and provide a reply to user device 205 that includes information associated with the phone number. As another example, messaging application server 230 may identify text, such as "hours," "closing," "location," "availability," "when," and/or the like, and may provide information that identifies hours of operation of a store associated with the enterprise, a time frame for a sale, a date and time for an event, and/or the like. As another example, messaging application server 230 may identify text that identifies a particular group, department, store, assistance center, and/or the like, associated with the enterprise, and may identify contract information associated with the particular group, department, store, assistance center, and/or the like.

In some implementations, messaging application server 230 may identify information associated with user device 205, and use the information when automatically generating a reply. For example, messaging application server 230 may identify a geolocation of user device 205, a subscription status of user device 205 (e.g., to a service, to an account, to an enterprise identifier, and/or the like), demographic information associated with a user of user device 205, and/or the like. Additionally, messaging application server 230 may use the information associated with user device 205 to identify a phone number, a store location, a particular contract address, and/or the like, to be included in the reply.

In some implementations, messaging application server 230 may identify information associated with user device 205 and provide, to client device 245, the information to permit an operator of client device 245 to more efficiently reply to a response. For example, messaging application server 230 may provide, to client device 245, information associated with user device 205 in association with an individual message thread, and/or information that permits client device 245 to identify the information associated with user device 205. In this way, an operator of client device 245 may use the information associated with user device 205 when replying to the response.

In some implementations, messaging application server 230 may identify, using natural language processing techniques, particular messages from user device 205 that might require more prompt assistance than as compared to other messages. Additionally, messaging application server 230 may cause client device 245 to provide individual message threads, associated with the messages, towards a top of a list of individual message threads, may cause the individual message threads to be flagged as urgent, and/or the like. In this way, messaging application server 230 may permit an operator of an enterprise to more readily identify particular messages that might require more immediate assistance.

By providing information associated with separate individual message threads, some implementations described herein reduce an amount of time and manual effort associated with managing enterprise messages. In this way, some implementations described herein conserve processor and/or memory resources of client device 245 and/or messaging application server 230 and/or conserve network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   provide, to a plurality of user devices and after receiving information associated with a selection of an enterprise identifier, a broadcast enterprise message that is sent using the enterprise identifier;
   receive, from a user device of the plurality of user devices, a response to the broadcast enterprise message after providing the broadcast enterprise message to the plurality of user devices,
   the user device being associated with a user device identifier;
   generate, based on receiving the response, a message thread that includes a set of messages communicated between the device, that is associated with the enterprise identifier, and the user device that is associated with the user device identifier,
   the set of messages including the broadcast enterprise message and the response; and
   provide, via an interface and based on generating the message thread, information associated with the message thread; and
   receive, via the interface of the device, information associated with the selection of the enterprise identifier from a set of enterprise identifiers,
   the set of enterprise identifiers being capable of being used to send other broadcast enterprise messages.

2. The device of claim 1, where the one or more processors are further to:
   provide, to the user device, another message after receiving the response to the broadcast enterprise message; and
   provide, via the interface, information associated with the other message in association with the message thread.

3. The device of claim 1, where the message thread does not include other messages communicated between other user devices of the plurality of user devices and the device.

4. The device of claim 1, where the enterprise identifier is one of:
   a short code; or
   a long code.

5. The device of claim 1, where the one or more processors, when providing the broadcast enterprise message, are to:
   broadcast the broadcast enterprise message using:
   one or more short message service (SMS) messages, or
   one or more multimedia message service (MMS) messages.

6. The device of claim 1, where the one or more processors are further to:

receive, via the interface and from a client device and before providing the broadcast enterprise message, the broadcast enterprise message.

7. The device of claim 1, where the one or more processors are further to:
receive, via the interface and from a client device, data associated with a query for user devices; and
identify, from a database of information identifying user devices and based on the data associated with the query, the plurality of user devices.

8. A non-transitory computer-readable medium storing instructions, the instructions comprising:
one or more instructions that, when executed by one or more processors of a device, cause the one or more processors to:
provide, to a plurality of user devices and after receiving information associated with a selection of an enterprise identifier, a broadcast enterprise message that is sent using the enterprise identifier;
receive, from a user device of the plurality of user devices, a response to the broadcast enterprise message after providing the broadcast enterprise message,
the user device being associated with a user device identifier;
generate a message thread that includes a set of messages associated with the enterprise identifier and the user device identifier,
the set of messages including the broadcast enterprise message and the response to the broadcast enterprise message;
provide information associated with the message thread based on generating the message thread; and
receive information associated with the selection of the enterprise identifier from a set of enterprise identifiers,
the set of enterprise identifiers being capable of being used to send other broadcast enterprise messages.

9. The non-transitory computer-readable medium of claim 8, where the one or more instructions, when executed by the one or more processors, further cause the one or more processors to:
receive, from another user device of the plurality of user devices, another response to the broadcast enterprise message,
the other user device being associated with another user device identifier; and
generate another message thread that includes another set of messages associated with the enterprise identifier and the other user device identifier,
the other message thread not including the set of messages associated with the enterprise identifier and the user device identifier.

10. The non-transitory computer-readable medium of claim 8, where the one or more instructions, when executed by the one or more processors, further cause the one or more processors to:
generate a set of broadcast enterprise message threads,
the set of broadcast enterprise message threads corresponding to a set of enterprise identifiers, and
the set of enterprise identifiers including the enterprise identifier; and
provide information associated with the set of broadcast enterprise message threads based on generating the set of broadcast enterprise message threads.

11. The non-transitory computer-readable medium of claim 8, where the enterprise identifier is a short code, and the user device identifier is a mobile directory number.

12. The non-transitory computer-readable medium of claim 8, where the one or more instructions, that cause the one or more processors to provide the broadcast enterprise message, further cause the one or more processors to:
broadcast the broadcast enterprise message using:
one or more short message service (SMS) messages, or
one or more multimedia message service (MMS) messages.

13. The non-transitory computer-readable medium of claim 8, where the one or more instructions, when executed by the one or more processors, further cause the one or more processors to:
receive, from a client device and before providing the broadcast enterprise message, the broadcast enterprise message.

14. The non-transitory computer-readable medium of claim 8, where the one or more instructions, when executed by the one or more processors, further cause the one or more processors to:
receive, from a client device, data associated with a query for user devices; and
identify, from a database of information identifying user devices and based on the data associated with the query, the plurality of user devices.

15. A method, comprising:
providing, by a device and to a plurality of user devices and after receiving information associated with a selection of an enterprise identifier, a broadcast enterprise message that is sent using the enterprise identifier;
receiving, by the device and from a user device of the plurality of user devices, a response to the broadcast enterprise message after providing the broadcast enterprise message,
the user device being associated with a user device identifier;
generating, by the device, a message thread that includes a set of messages communicated between the device, in association with the enterprise identifier, and the user device in association with the user device identifier,
the set of messages including the broadcast enterprise message and the response to the broadcast enterprise message;
providing, by the device and via an interface of the device, information associated with the message thread after generating the message thread; and
receiving, by the device and via the interface, the information associated with the selection of the enterprise identifier from a set of enterprise identifiers,
the set of enterprise identifiers being capable of being used to send other broadcast enterprise messages.

16. The method of claim 15, further comprising:
identifying the set of messages communicated between the device and the user device based on the enterprise identifier and the user device identifier; and
providing, via the interface, information associated with the set of messages in association with the message thread.

17. The method of claim 15, further comprising:
providing, to the user device, another message after receiving the response to the broadcast enterprise message from the user device; and
providing, via the interface, information associated with the other message in association with the message thread.

18. The method of claim 15, where the enterprise identifier is at least one of:
- a short code;
- a long code; or
- a telephone number.

19. The method of claim 15, further comprising:
- receiving, from a client device and before providing the broadcast enterprise message, the broadcast enterprise message.

20. The method of claim 15, further comprising:
- receiving, from a client device, data associated with a query for user devices; and
- identifying, from a database of information identifying user devices and based on the data associated with the query, the plurality of user devices.

\* \* \* \* \*